United States Patent
Price

(10) Patent No.: US 9,058,220 B2
(45) Date of Patent: Jun. 16, 2015

(54) GENERATION-BASED UPDATE CACHING FOR ROBUST SCALABLE DISTRIBUTED GIBBS SAMPLING

(71) Applicant: Palo Alto Research Center Incorporated, Palo Alto, CA (US)

(72) Inventor: Robert R. Price, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 147 days.

(21) Appl. No.: 13/726,818

(22) Filed: Dec. 26, 2012

(65) Prior Publication Data

US 2014/0181214 A1 Jun. 26, 2014

(51) Int. Cl.
*G06F 13/00* (2006.01)
*G06F 9/50* (2006.01)

(52) U.S. Cl.
CPC ..................... *G06F 9/5066* (2013.01)

(58) Field of Classification Search
CPC .. G06Q 10/10; H04L 29/08072; H04L 29/06; H04L 29/06034; H04L 12/1822
USPC ............................................ 706/12; 709/205
See application file for complete search history.

(56) References Cited

U.S. PATENT DOCUMENTS

2012/0117008 A1* 5/2012 Xu et al. .......................... 706/12

OTHER PUBLICATIONS

Fitzpatrick, Brad, "Memcached—a distributed memory object caching system", LiveJournal, www.danga.com/memcached/, printed May 29, 2013, pp. 1-2.
Resnik, Philip, et al., "Gibbs Sampling for the Uninitiated", Umiacs-TR-2010-04, Jun. 2010.
Newman, David, et al., "Scalable Parallel Topic Models", Journal of Intelligence Community Research and Development (2006), pp. 1-13.
Newman, David, et al., "Distributed Inference for Latent Dirichlet Allocation", In proc. Neural Information Processing Systems (NIPS), (2007), pp. 1-9.
Blei, David, et al., "Latent Dirichlet Allocation", Journal of Machine Learning Research, 3 (223), (2003), pp. 993-1022.
Bart, Evgeniy, "Speeding Up Gibbs sampling by variable grouping", http://www.umiacs.umd.edu/jbg/nips_tm_workshop/, Dec. 2, 2009, pp. 1-4.

(Continued)

*Primary Examiner* — Robert B Harrell
(74) *Attorney, Agent, or Firm* — Fay Sharpe LLP

(57) ABSTRACT

A system includes a plurality of processors programmed to perform distributed, iterative computations on aggregate statistics of a data set. Each of the processors maintains global statistics describing the data set. The processors are programmed to iteratively perform a plurality of Gibbs sampling sweeps over a corresponding subset of the data set to update the corresponding global statistics. The processors are further programmed to maintain differential vectors representing the changes made to the global statistics by local computation. These can be broadcast to other processors to create a consistent global statistic across processors. The differential vectors can be saved for a number of past generations to provide updates for slow processors, processors that have been down for some time and newly added processors to the network. Additional methods are described for efficiently compressing multiple differential vector updates in to a smaller number of equally informative updates.

18 Claims, 4 Drawing Sheets

(56) References Cited

OTHER PUBLICATIONS

Das Gupta, Mithun, "A Shared Parts Model for Document Image Recognition", Proceedings of the 9th International Conference on Document Analysis and Recognition, Curitiba, Brazil, Sep. 2007.

Asuncion et al., "Distributed Gibbs sampling for Latent Variable Models", Scaling Up Machine Learning, Cambridge University Press, pp. 217-237, 2012.

* cited by examiner

```
class Processor:
  init (Dp)
    V.initialize (Dp)         # a global aggregate statistic
    DV.initialize (Dp)        # sparse differential for statistic
    g<-0                      # generation
    A<- [ -1 ... -1 ]         # update generation AVAILABLE from each peer i
    R<- [ -1 ... -1 ]         # update generation RECEIVED OK from each peer
    M <- NULL    # Message from peer
    registerFor ("notify_event", notify)
    registerFor ("receive_event" receive)

notify(msg):
    A[msg.processor] <- msg.generation receive(msg):
    V.aggregate(msg)

update( ):
    updateStatistics (V, DV)
    broadcastAvailability (DV, g)
    g <- g + 1
    for q = 1 ... P:
      if A[q] > R [q]:
        request(R[q] +1, Vq,g)
        accept ( )

accept ( ):
    M <- readMsg ( )
    while not M= "EOM":
      V.aggregate (M)
      M <- readMsg ( )
    U[msg.processor] <- msg.generation Partition documents {D} ->{D1} ... {Dp} processors = new Processor [P]
For p = 1 ... P in parallel do
  processors [p].init (Dp)

UNTIL converged(processors):
  FOR p = 1 ... P in parallel do
    processors [p].update ( )
```

*FIG. 3*

GENERATION-BASED UPDATE CACHING FOR ROBUST SCALABLE DISTRIBUTED GIBBS SAMPLING

BACKGROUND

The present application relates generally to data processing. It finds particular application in conjunction with distributed Gibbs sampling and will be described with particular reference thereto. However, it is to be understood that it also finds application in any iterative process which uses and updates globally aggregated statistics over distributed data and is not necessarily limited to the aforementioned application.

Gibbs sampling is a key method for computing a posterior distribution over latent variables given some evidence. For instance, one might have the hypothesis that within a population of consumers there are two distinct subgroups, perhaps gender based, that differ in their mean buying rates. When group membership is not explicitly labeled, it needs to be inferred from other features of the observed data. Gibbs sampling could be used to estimate the probability that a user belongs to a particular group and to infer the average buying rates for each group. Further, Gibbs sampling has been instrumental in opening up new classes of hierarchical models that encode a wide variety of assumptions.

Now that data sets have become available for millions of users engaging in many activities over time, it is desirable to apply these models to these huge datasets. However, the data is no longer able to fit in the main or primary memory (e.g., random access memory (RAM)) of a single computer. Virtual memory could be used to store the data partly on secondary memory (e.g., a hard drive) as needed. However, Gibbs sampling methods require iterating over all of the data frequently, which would lead to processes quickly becoming input/output (I/O) bound.

One solution is to distribute the computation over multiple compute nodes (e.g., computers), each of which keeps a portion of the data completely in main memory. Global statistics are calculated by sending messages between compute nodes, which aggregate the messages to get a local estimate of global statistics. Distributing Gibbs sampling requires that the compute nodes exchange statistics on a regular basis to create global statistics reflecting the current beliefs about the data as a whole.

In the most naïve approach for exchanging statistics, each processor p keeps an array of statistics (e.g., counts) for the data $V_p$ representing its beliefs about the global dataset. Further, each processor p can receive an update from processor q with new counts $V_q'$. On receiving new counts $V_q'$ from processor q, processor p subtracts out the old counts $V_q$ from processor q and adds in the new counts $V_q'$ to get updated counts $V_p'$ as follows: $V_p' = V_p - V_q + V_q'$. In this way, processor p maintains an estimate of the statistic $V_p$ that is informed by all processors.

A challenge with exchanging statistics as described above is that it requires each receiving processor to store the previous counts received from the sending processor (i.e., $V_q$) to know what should be subtracted. When there are a large number of processors this will require storing 1000 s or 10000 s of copies of V, which is untenable.

One solution, described in Asuncion et al., "Distributed Gibbs Sampling for Latent Variable Models", Scaling Up Machine Learning, Cambridge University Press, 2012, is to use a sampling process to approximately remove the prior counts previously received from processor q. A sample the same size as the message from q is randomly drawn using processor p's current global generative model of the corpus and subtracted from p's global estimate. Processor q's counts are then added in to p's global estimate $V_p$. One can make a rough analogy here with exponential averaging in which a mean is updated incrementally with a new value: $V_p = V_p - \alpha^* V_p + \alpha^* V_q$.

This solution is attractive as it does not require any additional memory beyond that required to store the statistics $V_p$. However, the exponential average assumes that all of the samples come from the same distribution, which is not necessarily true. The different processors may contain subsets of data drawn from different sources causing them to have very different distributions. This solution is therefore only approximate and can lead to significant statistical biases that slow or even prevent convergence.

The present application provides a new and improved system and method which overcome the above-referenced problems and others.

INCORPORATION BY REFERENCE

Asuncion et al., "Distributed Gibbs Sampling for Latent Variable Models", Scaling Up Machine Learning, Cambridge University Press, 2012, is incorporated herein by reference in its entirety.

BRIEF DESCRIPTION

In accordance with one aspect of the present application, a system for Gibbs sampling is provided. The system includes a plurality of processors programmed to perform distributed Gibbs sampling on a global data set using global aggregate statistics. The global data set is partitioned into a plurality of local data subsets, one for each of the processors. Each of the processors includes an estimate of the global aggregate statistics for the global data set. Further, each of the processors is programmed to iteratively perform a plurality of Gibbs sampling sweeps over the local data subset of the processor using the global estimate to update the global estimate of the processor. The processor is further programmed to simultaneously update a sparse differential vector which gives the change or difference introduced into the global estimate during the previous sweep. The processor broadcasts the availability of this differential update at the end of its iteration to all processors on the network. The differential update is then cached in main memory so that it can be retrieved by other processors while the processor proceeds to its next iteration.

BRIEF DESCRIPTION OF THE DRAWINGS

FIG. 3 is pseudo code for asynchronously exchanging statistics between processors.

DETAILED DESCRIPTION

Figure 1:
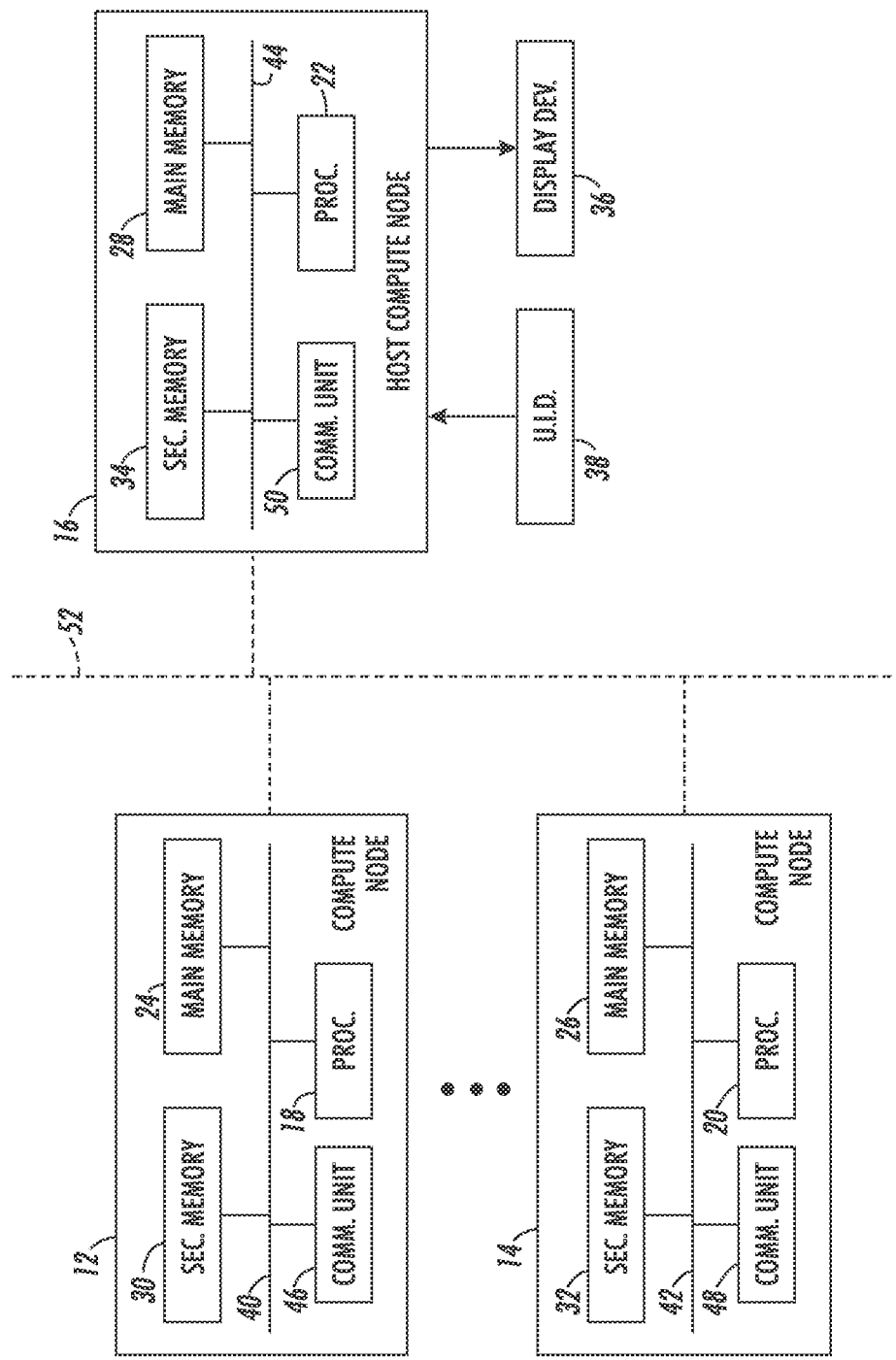
FIG. 1 is a block diagram of a system according to aspects of the present application.

To overcome the above described challenge with exchanging statistics (e.g., counts) for distributed Gibbs sampling, the present application discloses an approach in which the differential logic is moved from the receiving processor p to the sending processor q and focuses on clusters formed of large numbers of commodity distributed memory machines (i.e., the cloud scenario).

For asynchronous updates, suppose a computation depends on a global statistic V of a dataset that is aggregated from a cluster of servers (e.g., word counts for a collapsed Gibbs sampler used to implement Latent Dirichlet Allocation). A communication network interconnects the servers of the cluster. Further, each of the servers includes one or more processors and a subset of the data set, the subset loaded into the main memory of the server.

Each processor p in the cluster maintains an array $V_p$ representing processor p's current best estimate of the global statistic V over all the data. As computation proceeds (i.e., as the processors sweep or iterate through corresponding data subsets), processor p updates both the global estimate $V_p$ and a sparse differential vector $DV_p$ capturing the changes that processor p made to the global estimate $V_p$ during the current iteration. The current differential vector is typically stored in main or primary memory (e.g., random access memory (RAM)), whereas the differential vectors from previous iterations are typically stored in secondary memory (e.g., a mass storage, such as a hard drive).

A differential vector $DV_p$ is constructed to summarize the overall change made by processor p during a sweep or iteration. For instance, if the statistic in question is a set of counts, this change can be summarized by a vector of positive or negative numbers and the update can simply be added to the global estimate of the previous iteration $V_p$ to yield the current global estimate $V_p'$, as follows: $V_p' = V_p + DV_p$. However, aggregation can take different forms. A product update vector could take the form of scale factors that are either greater than 1 for scaling up or less than one for scaling down: $V_p = V_p * DV_p$. If the statistic V is a list of items, the differential vector $DV_p$ could be a sequence of delete and add operations: $V_p = V_p.apply(DV_p)$.

Once an iteration completes, processor p broadcasts a message m=(p, g) advertising the availability of a new generation g of update from processor p. All of the other processors receive these broadcasts and record these broadcasts in an availability vector A of available updates from the other processors. For example, a processor q has an interrupt handler which receives the message m=(p, g) that generation g is now available from processor p and records this in the availability vector $A_q$ at position p by saving the generation number g.

When processor q completes its current sweep, it checks for updates through comparison of a received vector $R_q$ with the availability vector $A_q$. The received vector $R_q$ is a vector maintained by processor q to track the updates received from the other processors. For example, a processor q records updates received from processor p in the received vector $R_q$ at position p by saving the received generation number g. The update check can then be performed by checking if the available generation A[p] is newer than the last received generation R[p] (i.e., whether A[p]>R[p]) for each processor p.

If a newer generation is available, processor q sends a request to processor p for generation R[p]+1. This might be a generation before A[p], if processor p has had the chance to do more than one update since q's last iteration began. Processor p then starts streaming generation R[p]+1 of the differential vector $DV_p$ to processor q. As the update streams in over the network, processor q updates its global statistics $V_q$ by aggregating it with the differential vector update $DV_p$ component by component. Further, the received vector R is updated with generation R[p]+1 at position p.

The receiving processor q does not require any additional main memory to store complete copies of statistic $V_p$ from other processors since messages are sparse differential vectors and they are aggregated component by component as they arrive. The sending processor p, however, requires some additional main memory to store the sparse differential vector $DV_p$ in addition to the current estimate of the global statistic $V_p$. This means that the size of V must be smaller than processor p's main memory size so that both global estimate $V_p$ and differential vector $DV_p$ fit in main memory. However, unlike the sampling process of Asuncion et al., "Distributed Gibbs Sampling for Latent Variable Models", Scaling Up Machine Learning, Cambridge University Press, pages 222-224, 2012, which approximately removes prior counts, the resulting statistics are exact and do not suffer from bias.

If processor q has missed an update due to latency issues or downtime, it can request previous generations from processor p to bridge the gap. As noted above, current generations are typically stored in main memory, whereas previous generations are typically stored in secondary memory. Hence, processor p may have to retrieve older generations from secondary memory. While retrieval from secondary memory is generally slow, this case is not expected to be frequent. The older generations are primarily intended to ensure overall system robustness to failed processors and allow a new processor to be started up and initialized with counts from its peers.

If the number of processors in the system is known, then processor p can keep track of which versions of the differential vector have been consumed by the other processors. If all other processors have consumed an update, it is unlikely to be needed in the near future. To improve efficiency, a sequence of updates that are unlikely to be used can be compressed together: $DV_p^{1,k} = DV_p^1 + DV_p^2 + \ldots + DV_p^k$. The compressed update can bring a processor from generation 0 to generation k in one step. The compression of updates allows the addition of a new processor or recovery of a failed processor to be much more efficient.

If all updates of a processor are lost, the sampling method of Asuncion et al., described at page 223, can be employed to bootstrap a new processor. The new processor learns from scratch so that the differential update of this processor is equal to the statistics of the lost processor. Then the receiving processors use the method of Asuncion et al. for removing an equivalent sample. Gibbs sampling then continues. Additional mechanisms can be employed to handle timeout of messages, recovery from partially transmitted messages and other exceptional conditions.

As should be appreciated, the foregoing dealt with asynchronous updates. However, synchronous updates are contemplated. In such embodiments, each processor waits for the other processors to complete before moving to the next iteration. Even more, as should be appreciated, communication for exchanging statistics was directed to unicasting. However, multicasting and broadcasting are also contemplated. For multicasting, an update message includes a differential vector for the multiple destination processors of the update message, but is otherwise the same as described above. With regard to broadcasting, update messages are broadcast as processors finish iterations or sweeps.

With reference to FIG. 1, a system 10 for performing distributed Gibbs sampling using the above described approach to exchanging statistics is provided. For ease of discussion, the system 10 is applied to train a latent Dirichlet allocation (LDA) topic model, which is a common type of model used in many document indexing systems. However, it is to be appreciated that the system 10 is equally amendable to other models to which Gibbs sampling can be applied, such as other types of latent variable models. Examples of other types of latent variable models include hidden Markov models and topic models, such as Hierarchical Dirichlet Processes.

The system 10 includes one or more compute nodes 12, 14, 16 for training the LDA topic model on a plurality of documents. The compute nodes 12, 14, 16 include a host compute node 16 which provides an interface for importing the plurality of documents into the system 10 and distributes the imported documents among the compute nodes 12, 14, 16, as discussed further below. The host compute node 16 can also schedule updates to the LDA topic model. The documents can be text documents, image documents, collaborative filtering records, videos, trajectories, or any other types of documents or records that can be represented by vectors of counts.

As an example, for text documents, each document can be represented by a vector of word counts over a vocabulary. The vocabulary is the set of words in the corpus of text documents, typically except stopwords, such as "the" and "and". For example, consider an animal example with a vocabulary consisting of "cat", "dog", "frog" and "bat". A document containing "frog" once and "bat" twice is denoted by the vector [0, 0, 1, 2]. As another example, for image documents, count data can be produced by identifying the locations of interest points in the images and representing an area of pixels around each interest point as an image descriptor. These descriptors can be then be clustered into visual words, which allow the images to be represented as vectors of counts.

The compute nodes 12, 14, 16 include a plurality of processors 18, 20, 22, one or more main memories 24, 26, 28 corresponding to the plurality of processors 18, 20, 22, and one or more secondary memories 30, 32, 34 corresponding to the plurality of processors 18, 20, 22. Typically, there is a one-to-one correspondence between the processors 18, 20, 22 and the main memories 24, 26, 28, but each processor includes at least of the main memories 24, 26, 28. Similarly, there is typically a one-to-one correspondence between the processors 18, 20, 22 and the secondary memories 30, 32, 34, but each processor includes at least one of the secondary memories 30, 32, 34. Each of the compute nodes 12, 14, 16 includes at least one of the processors 18, 20, 22, at least one of the main memories 24, 26, 28, and at least one of the secondary memories 30, 32, 34.

Each of the processors 18, 20, 22 includes processor executable instructions stored on at least one of its main memory and its second memory, but typically its main memory. The processor executes the processor executable instructions to train the LDA topic model using a distributed Gibbs sampling algorithm. The processors 18, 20, 22 typically store frequently accessed data in the corresponding main memories 24, 26, 28 and move less frequently accessed data to the corresponding secondary memories 30, 32, 34, since main memory is faster than secondary memory.

Figure 2:
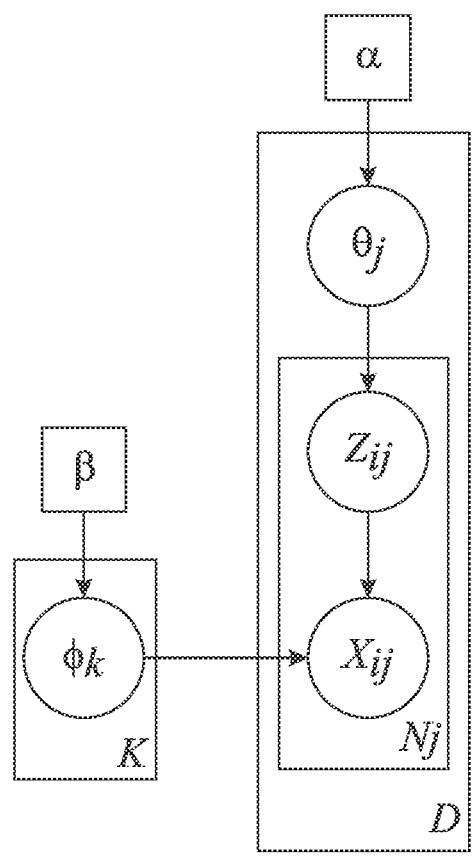
FIG. 2 is a graphical model for latent Dirichlet allocation.

The LDA topic model can be formally represented as described in Asuncion et al. As described therein, each of the plurality of documents (D documents) is modeled as a discrete distribution over K latent topics, $\theta_{k|j}$, where k is a latent topic and j is a document. For each document j, the distribution over topics, $\theta_{k|j}$, has a prior in the form of a Dirichlet distribution D[$\alpha$], where $\alpha$ is a user adjustable parameter. Further, each of the K latent topics is modeled as a discrete distribution over a vocabulary of W words, $\phi_{w|k}$, where w is a word and k is a latent topic. For each latent topic k, the distribution over words, $\phi_{w|k}$, has a Dirichlet distribution D[$\beta$], where $\beta$ is a user adjustable parameter. For the ith token in document j, a topic assignment $z_{ij}$ is drawn from $\theta_{k|j}$ and the word $x_{ij}$ is drawn from the corresponding topic $\phi_{w|k}$. With reference to FIG. 2, the graphical model for LDA is shown. Circles represent observed variables, squares represent parameters, and plates denote replication across indices.

To train the LDA topic model, the plurality of documents {D} are partitioned, by the host compute node 16, into a set of documents {D}={{D$_1$}, ..., {D$_P$}} for each processor p of the plurality processors 18, 20, 22 (P processors). For example, the plurality of documents (D documents) are partitioned among P processors with approximately D/P documents for each processor p. As another example, in a heterogeneous clusters with processors of varying computation power, additional documents might be assigned to a more powerful processors. Each processor p stores the assigned set of documents {D$_p$} in its main memory for faster access during Gibbs sampling.

In addition to partitioning the plurality of documents, the host compute node 16 partitions words in the plurality of documents x into x={x$_1$, ..., x$_P$} and partitions the corresponding topic assignments z into z={z$_1$, ..., z$_P$}, where processor p stores x$_p$ and z$_p$. Here, x$_p$ represents the words from documents j$\in${D$_p$} and z$_p$ represents the corresponding topic assignments. The words sets x$_{1 \ldots P}$ for processors can overlap.

After partitioning, the processors 18, 20, 22 perform Gibbs sampling on the documents in parallel with each processor p processing its document set {D$_p$}. The processing is suitably performed asynchronously, but can also be performed synchronously. Advantageously, asynchronous processing does not require global synchronization across all the processors 18, 20, 22, is fault tolerant, allows the use of heterogeneous compute nodes, and allows integration of new data in an online fashion.

With both asynchronous and synchronous processing, each processor p stores local variables: $x_{ij}^p$ and $z_{ij}^p$ in its main memory. $x_{ij}^p$ is the word type for each token i in document j on processor p, and $z_{ij}^p$ is the topic assignment for each token. Each processor p further stores $N_{wk}^p$, $N_{kj}^p$, and $N_w^p$ in its main memory. $N_{wk}^p$ is the word-topic count matrix (derived from $z^p$ and $x^p$) of both the local processor and other processors. $N_{kj}^p$ is the local document-topic count matrix (derived from $z^p$). $N_w^p$ is the word counts on processor p (derived from $x^p$). The foregoing counts are suitably initialized to zero before processing.

Each processor p then performs Gibbs sampling using its estimate of the global statistics (i.e., $N_{wk}^p$) and its local data (i.e., {D$_p$}). Computation proceeds until a termination condition is met. The termination condition can, for example, be a predetermined number of iterations or based on a Markov chain Monte Carlo (MCMC) convergence metric. For each iteration, each processor p sweeps through its local data, and updates topic assignments z$_p$, using the following conditional distribution:

$$p(z_{pij} = k \mid x_{pij} = w, z_p^{\neg ij}, x_p^{\neg ij}, \alpha, \beta) \propto \frac{(N^p)_{wk}^{\neg ij} + \beta}{\Sigma_w (N^p)_{wk}^{\neg ij} + W\beta} (N_{pkj}^{\neg ij} + \alpha).$$

In the above notation, missing indices are summed out. For example, $N_{wk} = \Sigma_j N_{wjk}$, where $N_{wjk}$ is the number of times word w is assigned to topic k in document j. Further, ¬ij indicates that the current word is excluded from the counts or set of variables.

After processor p sweeps through its local data and updates topic assignments z$_p$, processor p has an updated $N_{wk}^p$ and a differential vector $DN_{wk}^p$. $DN_{wk}^p$ describes the overall change made to $N_{wk}^p$ by processor p during a sweep or iteration (i.e., the difference between $N_{wk}^p$ before the sweep and after the sweep). If the topic of a token is changed, the respective word column of the differential vector would be decremented for the old topic and incremented for the new topic. These modifications to $N_{wk}^p$ must be shared with the other processors to maintain global consistency with z.

To maintain statistical coherence the processors 18, 20, 22 must complete their respective sweeps before exchanging modifications and moving to the next iteration. In a synchronous update strategy, the processors 18, 20, 22 all wait until an iteration is completed before the exchange. However, the approach for exchanging statistics of the present invention also admits to an asynchronous mode. Each processor p sends out a notice that its update is ready, collect updates from whatever other processors have published updates and continue on to the next iteration.

To perform the update, each processor p examines received notifications to see if there are updates available from other processors. If processor p has take a longer than other processors to finish an iteration, some processors may have completed several iterations and sent several update notifications. For each processor q making an update available, processor p sends a request for the immediate next generation of update required. When the update from q starts to spool in, it adds the differential vector components to its count of word-topic counts: $N_{wk}^{p'} = N_{wk}^p + DN_{wk}^q$. The processor then requests the next update generation and applies it. Once it has finished all of the updates from one processor peer, it moves on to the next processor peer. Once it has completed all updates, it performs a new iteration. In a large cluster, updates may arrive continuously. In this case, the processor may process up to a maximum number of updates before returning to iteration.

The efficiency of broadcast updates can be improved by collapsing updates from a subset of processors together before broadcasting them. For instance, one of the processors r collects updates and then distributes the aggregated update vector. Namely, each processor q sends it's differential vector $DN_{wk}^q$ to the processor r. The processor r adds the differences from each other processor q to create an aggregated differential $DN_{wk}^r$. The processor r then sends this aggregated update vector to each other processor p. Alternatively, the processor r could apply the aggregated differential vector to its own estimate of the global counts to get $N_{wk}^r$. This global matrix could then be broadcast to other processors which would accept this global estimate as their own: $N_{wk}^{p'} = N_{wk}^r$. This would only be appropriate if the vectors were relatively small. The foregoing two approaches can further enhanced by arranging the processors in a hierarchy of regions, where each region has a processor r acting as described above for its respective region.

Pseudo code illustrating the approach to distributed processing is provided in FIG. 2. Therein, "updateStatistics" refers to a specific application function, such as a Gibbs sampling sweep. Additional code to handle time outs and communication errors, as well as compressed updates, is not shown for clarity. As can be seen, the code describes an event-based implementation of the approach to exchanging statistics.

After completing the distributed Gibbs sampling algorithm, samples from the posterior $p(z|x,\alpha,\beta)_3$ can be used to compute estimates for the topics $\{\phi_{w|k}\}$ and topic mixtures $\{\theta_{k|j}\}$. The topic mixtures $\{\theta_{k|j}\}$ can be used for document retrieval and clustering by one of the compute nodes 12, 14, 16, or by an external system and/or device. For example, the host compute node 16 can be employed to allow users of the system 10 to retrieve documents from the plurality of documents based on samples from the posterior $p(z|x,\alpha,\beta)$.

Where the host compute node 16 is employed to allow users of the system to retrieve documents, the processor executable instructions of the host compute node 16 provide a user with a user interface. The user interface allows the user to specify search criteria for a document distributed across the compute nodes 12, 14, 16. Typically, the user interface displays graphical elements, such as icons, windows, menus, and so on, to a user on a display device 36. The user interface further allows the user to manipulate and/or otherwise interact with the graphical elements to interact with the host compute node 16 using a user input device 38 to specify the search criteria.

The processor executable instructions of the host compute node 16 further perform a search for documents across compute nodes based on samples from the posterior $p(z|x,\alpha,\beta)$. Suitably, the search results are displayed to the user on the display device 36 and/or otherwise made accessible to the user.

To facilitate internal communication between components of the compute nodes 12, 14, 16, each of the compute nodes 12, 14, 16 includes at least one system bus 40, 42, 44. The system bus interconnects the corresponding processor(s), the corresponding main memory(ies), and the corresponding secondary memory(ies). Further, to facilitate external communication between the compute nodes 12, 14, 16 and/or other systems and/or devices, each of the compute nodes 12, 14, 16 includes a communication unit 46, 48, 50. Communication between the compute nodes 23, 14, 16 is typically performed over a communication network 52, such as a local area network (LAN). The communication units 46, 48, 50 include interrupt handling mechanisms that allow the corresponding processors 18, 20, 22 to handle asynchronous update messages arriving from other processors.

Figure 4:
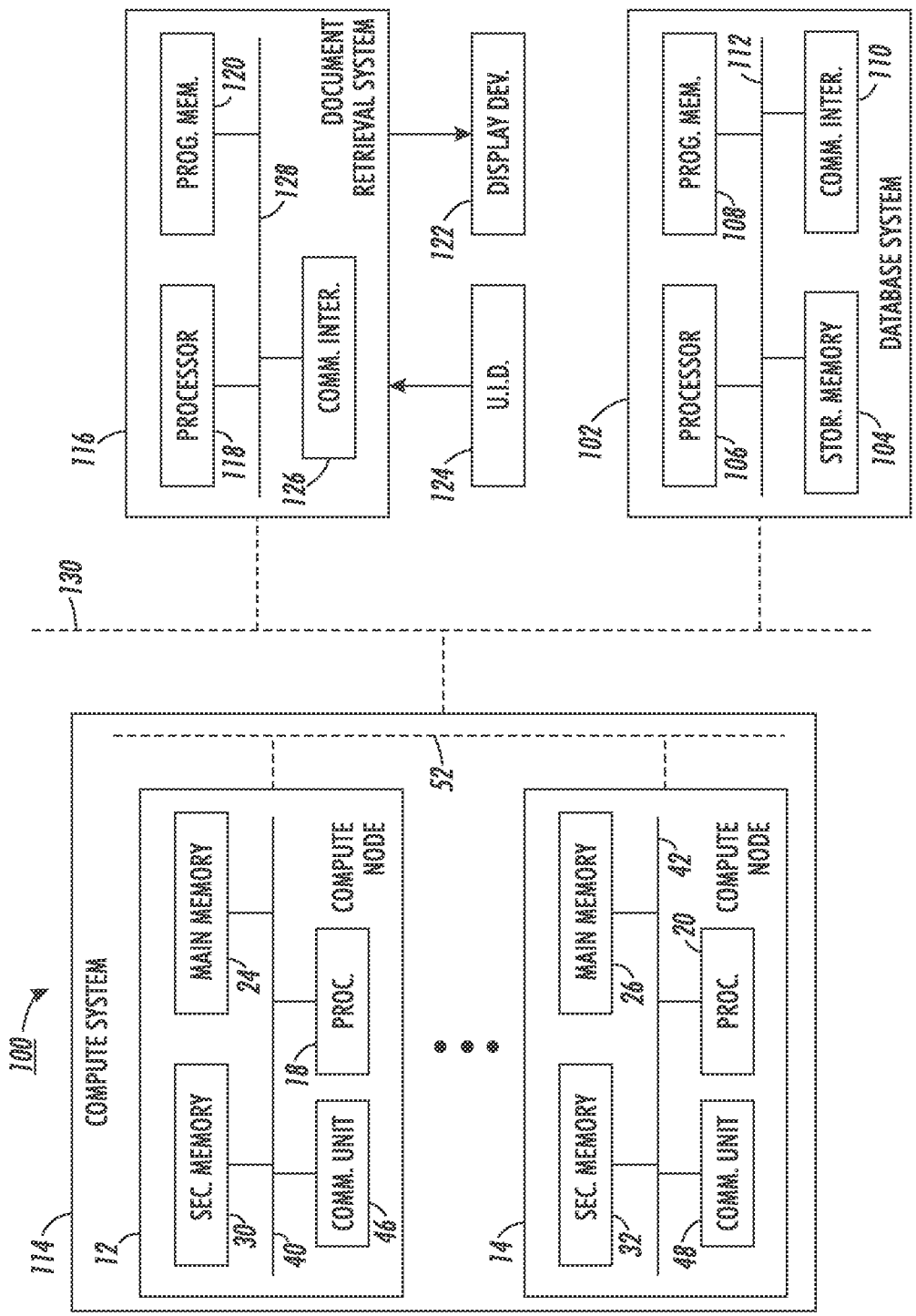
FIG. 4 is a block diagram of another system according to aspects of the present application.

With reference to FIG. 4, another system 100 for performing distributed Gibbs sampling using the above described approach to exchanging statistics is provided. As above, the system 10 is applied to train a latent Dirichlet allocation (LDA) topic model, which is a common type of model used in many document indexing systems. However, it is to be appreciated that the system 10 is equally amendable to other models to which Gibbs sampling can be applied, such as other types of latent variable models.

The system 100 includes a database system 102 storing a plurality of documents to be modeled (e.g., by an LDA topic model) in one or more storage memories 104. The storage memories 104 are typically secondary memories, such as hard drives, but can also be primary memories, such as RAM. The documents can be text documents, image documents, collaborative filtering records, videos, trajectories, or any other types of documents or records that can be represented by vectors of counts.

The database system 102 includes one or more processors 106 and one or more program memories 108. The program memories 108 include processor executable instructions executed by the processors 106 to allow access to the plurality of documents. The program memories 108 are typically main or primary memories, such as RAM. In some embodiments, the program memories 108 and the storage memories 104 are the same and/or overlap.

To allow communication with external systems and/or devices, as well as communication between internal components to the system, the database system 102 further includes one or more communication units 110 and one or more system buses and/or communication networks 112. The communication units 110 allow the processors 106 to interface with external devices and/or systems. The system buses and/or communication networks 112 interconnect the processors 106, the program memories 108, the storage memories 104 and the communication units 110.

Typically, the database system 102 is formed from one or more computers storing the documents, but is typically formed from a plurality of computers. Each computer includes at least one of the processors 106, at least one of the program memories 108, at least one of the storage memories 104, at least one of the communication units 110 and at least one system bus of the system buses and/or communication networks 112 to interconnect the processor, the memory and the communication unit. Further, each of at least one of the computers includes at least one of the storage memories 104 interconnected with the processor, the memory and the communication unit by the system bus. Where the database system 102 includes a plurality of computers, a communication network of the system buses and/or communication networks 112 suitably interconnects the computers.

The system 100 further includes a compute system 114 comprised of one or more compute nodes 12, 14 for training the LDA topic model on the plurality of documents in the database system 102 using a distributed Gibbs sampling algorithm. The compute nodes 12, 14 are as described above in FIG. 1, except that they do no rely upon a host compute node 16. One of the compute nodes 12, 14 or some other system and/or device of the system 100 performs the partitioning described in connection with the host compute node 16 of FIG. 1. The compute nodes 12, 14 then load their assigned documents into main memory from the database system 102. After completing the distributed Gibbs sampling algorithm, samples from the posterior $p(z|x,\alpha,\beta)$ can be used to compute estimates for the topics $\{\phi_{w|k}\}$ and topic mixtures $\{\theta_{k|j}\}$. The topic mixtures $\{\theta_{k|j}\}$ can be used for document retrieval and clustering.

A document retrieval system 116 of the system 100 allows users to retrieve documents from the database system 102 based on samples from the posterior $p(z|x,\alpha,\beta)$. The document retrieval system 116 includes one or more processors 118 and one or more program memories 120 (e.g., main or primary memory), the program memories 120 including processor executable instructions executed by the processors 118.

The processor executable instructions provide a user with a user interface. The user interface allows the user to specify search criteria for a document within the database system 102. Typically, the user interface displays graphical elements, such as icons, windows, menus, and so on, to a user on a display device 122. The user interface further allows the user to manipulate and/or otherwise interact with the graphical elements to interact with the document retrieval system 116 using a user input device 124 to specify the search criteria.

The processor executable instructions further perform a search for documents in the database system 102 based on samples from the posterior $p(z|x,\alpha,\beta)$ received from the compute system 114. Suitably, the search results are displayed to the user on the display device 122 and/or otherwise made accessible to the user.

The document retrieval system 116 further includes one or more communication units 126 and one or more system buses and/or communication networks 128. The communication units 126 allow the processors 118 to interface with external devices and/or systems, such as the compute system 114. The system buses and/or communication networks 128 interconnect the processors 118, the program memories 120 and the communication units 126.

Typically, the document retrieval system 116 is formed from one or more computers. Each computer includes at least one of the processors 118, at least one of the program memories 120, at least one of the communication units 126 and at least one system bus of the system buses and/or communication networks 128 to interconnect the processor, the memory and the communication unit. Where the document retrieval system 116 includes a plurality of computers, a communication network of the system buses and/or communication networks 128 suitably interconnects the computers.

To facilitate communication between the individual systems of the system 100, such as the compute system 114, a communication network 130 interconnects the individual systems. The individual systems can then communicate by way of the communication network 130 using corresponding communication units.

While, the individual systems of the documents processing system were discretely described for ease of discussion. It is to be appreciated that the individual system can be combined in any combination, and any system architecture in which there are multiple processors can be employed with the distributed Gibbs sampling algorithm discussed above. For example, the database system 102 and the compute system 114 can be combined.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), an FPGA, and the like; a user input device includes one or more of a mouse, a keyboard, a touch screen display, one or more buttons, one or more switches, one or more toggles, voice recognition engines, and the like; a database includes one or more memories; a display device includes one or more of a LCD display, an LED display, a plasma display, a projection display, a touch screen display, and the like; and a communication network includes a local area network (LAN), a wide area network (WAN), a virtual private network (VPN), the Internet, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for efficiently computing iterative functions over aggregate statistics of a distributed data set, said system comprising:

a plurality of processors programmed to perform distributed computations, the distributed data set partitioned into a plurality of data subsets, one for each of the plurality of processors, wherein each of the plurality of processors includes: 1) statistics describing a current best estimate of the aggregate statistics; and 2) a differential vector describing changes to the statistics describing a current best estimate of the aggregate statistics for a current iteration;

wherein each of the plurality of processors is programmed to:
iteratively perform a plurality of sweeps over the data subset of the processor to update the statistic until a termination criteria is satisfied;
compute a differential vector representing the changes made during the update;

save the differential vector of the processor for a predetermined number of past generations, each generation corresponding to an iteration of the processor;

receive a generation-specific update from a sending one of the plurality of processors, the generation-specific update including a differential vector of the sending processor corresponding to the specific generation of the generation-specific update, wherein differential logic used to generate the differential vector is located on the sending one of the plurality of processors; and aggregate the differential vector of the generation-specific update with the statistics of the receiving processor, wherein the processor receiving the generation-specific update does not require main memory to store complete copies of the statistics one of the plurality of from sending processors, as the update includes sparse differential vectors which are aggregated component by component as received.

2. The system according to claim 1, wherein the plurality of processors are programmed to:

asynchronously perform sweeps in parallel;

broadcast the availability of generation-specific updates at the end of iterations, each generation-specific update including a generation of the corresponding differential vector;

service requests for the generation-specific updates from other processors;

record the availability of generation-specific from other processors;

request available generation-specific updates from other processors; and update corresponding statistics asynchronously as generation-specific updates arrive from other processors.

3. The system according to claim 1, wherein one of the plurality of processors is programmed to:

collapse past generations of the differential vector together via an aggregation operator to provide a compact, extended update.

4. The system according to claim 1, wherein one of the plurality of processors is programmed to:

broadcast a differential update message to all other processors simultaneously, and wherein each other processor is programmed to:

update its statistics from the received differential update message.

5. The system according to claim 1, wherein the distributed computations train a latent variable model with the distributed data set.

6. The system according to claim 1, wherein the plurality of processors are arranged in a hierarchy of regions, and wherein a processor for a region of the hierarchy of regions is programmed to:

aggregate the differential vectors of the processors of its region into a condensed differential vector; and pass the condensed differential vector to the other processors of the region.

7. The system according to claim 1, wherein one of the plurality of processors is programmed to:

copy the statistics of the processor to the differential vector of the processor;

perform a sweep over the data subset of the processor to update the statistics of the processor; and set the differential vector of the processor to the difference between the differential vector of the processor and the statistics of the processor to improve the efficiency of performing multiple sweeps in a single iteration.

8. The system according to claim 1, wherein one of the plurality of processors is programmed to:

use a sampling method to approximately remove a prior sample from the statistics of the processor before adding a new sample to the statistics of the processor.

9. The system according to claim 1, wherein the statistics of the plurality of processors describe statistics for Gibbs sampling.

10. A method for efficiently computing iterative functions over aggregate statistics of a distributed data set, said system comprising:

performing by a plurality of processors distributed computations, the distributed data set partitioned into a plurality of data subsets, one for each of the plurality of processors, wherein each of the plurality of processors includes: 1) statistics describing a current best estimate of the aggregate statistics; and 2) a differential vector describing changes to the statistics describing a current best estimate of the aggregate statistics for a current iteration;

for each of the plurality of processors:

iteratively performing a plurality of sweeps over the data subset of the processor to update the statistic until a termination criteria is satisfied;

computing a differential vector representing the changes made during the update;

saving the differential vector of the processor for a predetermined number of past generations, each generation corresponding to an iteration of the processor;

receiving a generation-specific update from a sending one of the plurality of processors, the generation-specific update including a differential vector of the sending processor corresponding to the specific generation of the generation-specific update, wherein differential logic used to generate the differential vector is located on the sending one of the plurality of processors; and aggregating the differential vector of the generation-specific update with the statistics of the receiving processor, wherein the processor receiving the generation-specific update does not require main memory to store complete copies of the statistics one of the plurality of from sending processors, as the update includes sparse differential vectors which are aggregated component by component as received.

11. The method according to claim 10, further including:

for the plurality of processors asynchronously performing sweeps in parallel;

broadcasting the availability of generation-specific updates at the end of iterations, each generation-specific update including a generation of the corresponding differential vector;

servicing requests for the generation-specific updates from other processors;

recording the availability of generation-specific from other processors;

requesting available generation-specific updates from other processors; and updating corresponding statistics asynchronously as generation-specific updates arrive from other processors.

12. The method according to claim 10, further including:

for one of the plurality of processors, collapsing past generations of the differential vector together via an aggregation operator to provide a compact, extended update.

13. The method according to claim 10, further including:
for one of the plurality of processors is programmed to:
broadcasting a differential update message to all other processors simultaneously, and wherein each other processor is programmed to:
updating its statistics from the received differential update message.

14. The method according to claim 10, wherein the distributed computations train a latent variable model with the distributed data set.

15. The method according to claim 10, wherein the plurality of processors are arranged in a hierarchy of regions, and said method further including:
for a processor of a region of the hierarchy of regions:
aggregating the differential vectors of the processors of its region into a condensed differential vector; and
passing the condensed differential vector to the other processors of the region.

16. The method according to claim 10, further including: one of the plurality of processors:
copying the statistics of the processor to the differential vector of the processor;
performing a sweep over the data subset of the processor to update the statistics of the processor; and
setting the differential vector of the processor to the difference between the differential vector of the processor and the statistics of the processor to improve the efficiency of performing multiple sweeps in a single iteration.

17. The method according to claim 10, wherein the method steps are performed from a non-transitory computer readable medium carrying software which controls the plurality of processors.

18. A system for Gibbs sampling comprising:
a plurality of processors programmed to perform distributed Gibbs sampling on a data set, the data set partitioned into a plurality of subsets, one for each of the plurality of processors, wherein each of the plurality of processors includes local counts describing a subset of each of the plurality of processors and global counts describing one or more other subsets; and,
wherein each of the plurality of processors is programmed to:
iteratively perform a plurality of Gibbs sampling sweeps over the subset one of the plurality of processors to update the local counts of the one processor, wherein each of the Gibbs sampling sweeps uses the global counts of the one processor;
save local counts of the one processor describing the subset of the one processor for each of a predetermined number of past generations, each generation corresponding to an iteration;
subtract a saved past generation of local counts of the one processor from a current generation of local counts of the one processor to determine deviations of the one processor; and,
send the deviations of the one processor to one of the other processors to update the global counts of the other processor.

\* \* \* \* \*